United States Patent Office 3,337,321
Patented Aug. 22, 1967

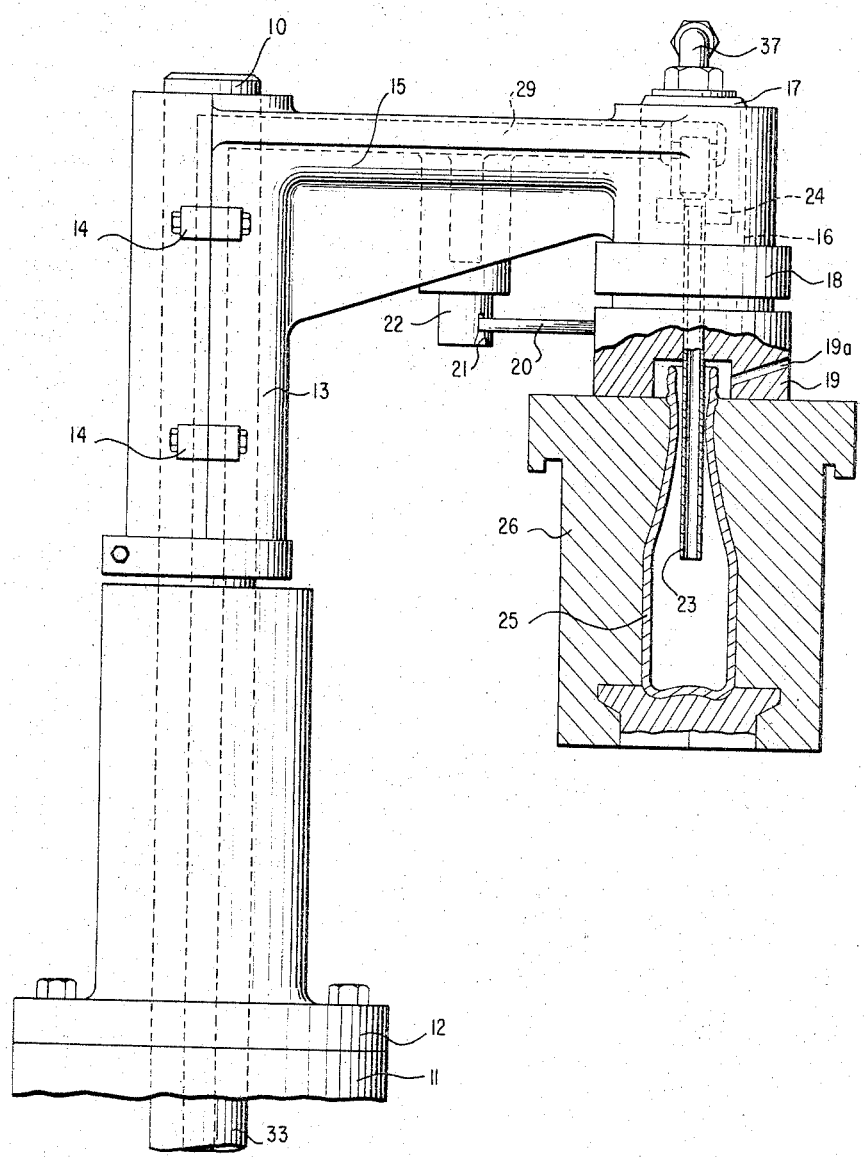

3,337,321
METHOD FOR IMPROVING THE DURABILITY OF GLASSWARE
Jo Morgan Teague, Jr., and Bradley Earl Wiens, Toledo, Ohio, assignors to Owens-Illinois, Inc., a corporation of Ohio
Filed Dec. 5, 1963, Ser. No. 328,230
10 Claims. (Cl. 65—30)

The present invention relates to methods for treating glassware for improving the durability of the surfaces thereof, and more particularly, to methods for improving the chemical durability and resistance of glass surfaces by producing an invisible, insoluble film on the surface of the glass at the blowing and cooling stage while the glass surface is in a highly reactive condition. The present invention also relates to glass articles, the surfaces of which have been treated by the aforesaid method.

Glass and, therefore, containers and receptacles made of glass are susceptible to attack by certain materials. For example, the commonly employed glass compositions that are used in the manufacture of conventional glassware containers are subject to a marked degree of attack by aqueous solutions of acids and alkalis. Moreover, the commercially available glassware containers made from soda-lime glass experience a slow weathering action by water when stored in a humid atmosphere. Aqueous solutions, particularly if unbuffered and near neutral or acidic in nature will act on the surfaces of the glass to leach out various ingredients of the glass composition, the alkalis in particular. The leaching action causes alkaline hydroxides to pass into solution and mingle with the contents of the container. A gradual rise in the pH of the solution brought about by the presence of the alkaline hydroxide may cause an undesirable change to take place with respect to the product. For example, one or more ingredients may precipitate out or a color change may occur, either of which may result in the product becoming unsightly or spoiled and no longer suitable for the intended purpose. The nature of alkaline attack is for total dissolution of the glass network structure. Morey devotes an entire chapter to the chemical resistance and durability of glass in his book Properties of Glass, Reinhold Publishing Company, 1954, Second Edition.

A number of different methods involving different compositions have been employed in the past for treating glass surfaces in order to improve their chemical durability and chemical resistance. These efforts have been directed at obtaining glass containers, such as bottles and jars for packaging aqueous materials, including particularly aqueous alkaline or acid materials, that are capable of long service life without danger of deterioration of the interior surface of the container and spoilage or contamination of the contents.

In some prior known methods the glass surfaces are treated in an entirely separate operation after the containers leave the glass forming machine. Other methods have been developed wherein the interior surfaces of the parisons in the molds of the glass-forming machines are treated with the vapors or fumes of various materials. However, a considerable number of these methods have accompanying drawbacks and disadvantages, such as creation of noxious fumes, difficulties in handling corrosive materials and the like.

In addition, some of the above processes produce visible deposits in the glassware thereby deleteriously affecting the appearance. Furthermore, soluble by-products are sometimes formed which may contaminate the product.

Several other methods for treating the interior of glassware during the forming stage of the glassware where the parison is subject to a simultaneous blowing and cooling have been developed heretofore. Included are those whereby water vapor or steam is introduced in the blow air, functioning to simultaneously expand and cool the parison. This type of process, which may termed water-mist cooling has a desirable effect on the surface. However, it is desirable to develop more efficient methods so as to be able to simultaneously render the surfaces of the glassware sufficiently chemically resistant and durable while simultaneously forming the glass object from the parison and also avoid formation of undesirable by-products.

Accordingly, it is an object of the present invention to avoid the disadvantages and shortcomings of the known methods and compositions for treating glass surfaces to improve their durability.

It is a further object of this invention to provide a method for improving chemical resistance and durability of glass surfaces while the glass is in a highly reactive state.

It is another object of this invention to provide a method for substantially simultaneously introducing the treating agent with the blow air to modify the glass surface of an expanding parison.

It is a further object of this invention to provide an invisible and insoluble film on a glass surface which film improves the chemical durability and resistance of the glass surface.

It is a further object of this invention to provide a method for blowing and cooling glassware which produces glassware whose surfaces are rendered chemically resistant and durable against attack by aqueous solutions.

It is a further object of this invention to provide hollow glassware containers, the interior surfaces of which have improved chemical durability and resistance.

In attaining the objects of this invention, one feature resides in introducing into a glass parison a colloidal sol which reacts on the surface of the glass to form an invisible, substantially continuous, insoluble, and highly adherent coating on the interior of the formed article.

Another feature of the present invention resides in atomizing a dilute colloidal sol into a glass parison during expansion thereof whereby the surface of the glass is rendered resistant to attack by materials which would normally leach out various components of the glass composition.

The above and other objects, features and advantages of the present invention will become readily apparent upon reading the following description of the invention taken in conjunction with the accompanying drawing, wherein the figure shows a water-mist cooling apparatus that can be employed for purposes of the present invention.

In carrying out the invention, it has now been discovered that the chemical resistance and durability of glassware containers of all types, such as jars, bottles and the like can be improved by introducing a colloidal alumina sol into the parison during expansion thereof in the glass forming machine while the glass article is being formed. At this stage in the manufacture of the glassware container the glass surface is in an extremely reactive condition. The colloidal alumina sol is sprayed or preferably atomized onto the surface of the expanding parison where it reacts on the surfaces of the glass. Because of the particular characteristics of the colloidal sol it has an affinity toward the glass surface not possessed by other refractory oxide materials.

While in the preferred embodiment the colloidal sol is introduced into the glass parison substantially simultaneously with the blow air, it will be understood by those in the art that the parison may first be expanded within the mold by blow air, per se, and the colloidal sol may subsequently be introduced in atomized or mist form into the fully expanded completed article while still in the mold. The colloidal sol may also be introduced as the mold opens and as the article is being taken out with the take-out tongs, for example.

The colloidal alumina sol is preferably introduced into the parison through the blowheads using an apparatus and process similar to that employed in the water-mist cooling method. The use of a cooling fluid such as air is known to effect more rapid cooling of the glass article through its tempering temperature range. The water that is present in the sol functions to make the cooling of the glass far more efficient and effective. It is to be understood that the colloidal alumina sol can be introduced substantially simultaneously with blow air or thereafter.

When the method of this invention is carried out in its preferred embodiment, the colloidal alumina sol is introduced during the operation of blowing the parison to the finished form in the finishing mold and prior to leaving the finishing mold. The temperature of the glass at this time is not substantially below the deformation temperature. Various blowing apparatus can be employed for purposes of the present invention, including that described in U.S. Patents Nos. 2,154,490 and 2,515,372, the disclosures of which are incorporated herein by reference.

Referring to the accompanying drawing, which illustrates one of the apparatus that can be employed for purposes of the present invention, there is shown a vertically disposed rod 10 which may be the blow head supporting and operating piston rod of the well-known Hartford I.S. forming machine. This rod is supported and operated by a piston (not shown) in a vertically disposed cylinder 11, which is shown in part in FIG. 1. The upper head 12 of this cylinder is shown in FIG. 1.

A sleeve 13 has clamp portions 14 by which it is secured releasably to the upper portion of the vertical rod 10. This sleeve carries a laterally extending bracket arm 15 which is utilized to support and carry a novel combination blow head and cooling mechanism and valve for controlling flow rates of the fluids.

The outer end portion of the bracket arm 15 is provided with a vertical bore or opening 16 in which is mounted the hollow stem 17 of a chuck or holder 18 for a blow head 19. The blow head 19 may be coupled to its holder 18 by a suitable well-known manner.

A laterally extending rod 20 is provided on the blow head which engages with a slot 21 in the lower end portion of a keeper 22 to prevent the blow head from rotating in its holder to accidentally disengage the blow head from its holder.

The holder 18 is retained in the vertical opening 16 of the bracket arm 15 in a suitable manner. A fluid pressure delivery tube 23, depends from a hollow supporting plug 24, retained within the blow head holder 18. The tube extends below the blow head 19 and will extend within a hollow article, such as the bottle 25, when the blow head 19 is seated on the mold 26. The lower end portion of this plug is enlarged so that when it is seated within the stem portion 17 of the holder 18, it will divide the interior of the stem into two chambers. The tube 23 extends upwardly and is fixed to the plug 24. Fluid under pressure, which in this case is air, will enter from a passage 29 which extends through the arm 15 and communicates with the interior of the plug. The blow air is supplied to the passage 29 through a vertical bore 33 in the rod 10.

The colloidal sol is introduced into the upper end of the plug through an elbow fitting 37. In order to provide efficient use of sol as a coolant or tempering medium for the bottles 25, it is necessary to regulate the quantity of sol which is introduced within the bottles and this can be accomplished by inserting a suitable control valve inside the hollow holder for the blow head.

When introduced to the interior of a hot blown bottle, the water present in the sol will extract a considerable amount of heat from the bottle 25 due to its latent heat of vaporization. However, it has been found in some instances that it is not desirable to produce bottles which have any moisture remaining therein after removal from the blow mold. Therefore, the introduction of the sol to the blown ware is discontinued at a time in the forming cycle such that the blow air, which is continued to be blown through the tube 23, will sweep out any moisture or water vapor from the interior of the bottle through a vent 19a in the blow head 19. In order to provide this cycle of application of sol, it is necessary that the quantity of sol which is introduced be regulated and it is also important that there will be substantially no sol dripping from the tube 23 during the movement of the blow head between the blowing of successive bottles.

It is well-known that the molds on a forming machine are normally hot and when the parisons are transferred to the blow molds, they also are in a particular thermal condition in which certain areas of the parison must be hotter than or in relatively more fluid condition so that upon expansion the glass will evenly conform to the shape of the blow mold cavity. Thus it is important that when the blow head is first seated over the blow mold that the various components that are introduced through the tube 23, be closely controlled both as to time of introduction and quantity.

The above apparatus is more fully described and is the claimed invention in copending application No. 136,519, filed Sept. 7, 1961, now Patent No. 3,225,353, and assigned to the assignee of the present application.

The colloidal sol material that can be employed for purposes of the present invention is a colloidal alumina sol, available as a free-flowing, white powder containing clusters of 100 x 5 millimicrons micro-fibrils of boehmite alumina whose surface is modified by adsorbed acetate ions. The particles have a specific surface area of approximately 270 square meters per gram and can be directly formed and baked into gamma-alumina bodies with very high porosity and surface activity. In water, the alumina powder swells quickly and disperses to form a translucent, slightly acid (pH 4.0) sol of positively charged particles. The typical physical properties of this material are a bulk density of 261 lbs. per cubic foot when loose and a packed bulk density of 31 lbs. per cubic foot. The absolute density of the fibril is 2.28 grams/cc. with a positively charged particle when in the sol.

Fibrous alumina suitable for the present invention has an average fibril length in the range of about 25 to 1500 millimicrons and the remaining average dimensions being in the range of 3 to 10 millimicrons. The fibrils have a surface area which ranges between 200 and 400 square meters per gram. Preferred fibrils for use in the processes and products of this invention have an average length in the range of about 100 to 700 millimicrons, the remaining average dimensions being in the range of from 3 to 5 millimicrons. The axial ratio being from 50:1 to 150:1 and a surface area of from 250 to 350 square meters per gram. Typical chemical composition for the colloidal alumina sol useful for the purposes of the present invention is as follows:

| | Percent |
|---|---|
| $AlOOH$ | 84.7 |
| $CH_3COOH$ | 8.5 |
| $SO_4$ | 1.76 |
| $H_2O$ | 2.7 |

The colloidal alumina sol that can be employed in the present invention is more fully described in U.S. Patent No. 3,013,901, the entire disclosure of which is incorporated herein by reference.

Carrying out the invention any type of parison can be treated as long as the conditions set forth in the present application are adhered to and the normally followed procedures in water-mist cooling methods are followed.

The chemical durability and resistance of glass surfaces treated in accordance with the described invention can be remarkably improved as shown in the example which follows hereinafter. The following example will serve to illustrate the present invention but is not considered limiting thereof in any way.

The ASTM test BW was carried out in the following example and is described in ASTM designation C225-59T. Briefly described, this test is carried out by filling the containers with water, heating and permitting the container to cool by standing for a certain period of time after which the test solution is transferred from the containers to flasks of chemically resistant glass and titrated with 0.020 N $H_2SO_4$. The data reported indicates that the quantity of acid required will be in direct relation to the extent to which the glass containers have been attacked by the water. Accordingly, in the example which follows, the containers treated according to the method of the present invention show a significantly lower figure for the milliliters of acid required for titration than do the untreated containers.

*Example*

Employing a 1% colloidal alumina sol, 3 gallons of the sol were introduced into the tank in a water-mist cooling apparatus shown in FIG. 1. By means of air pressure the sol was forced into the vaporizing unit at the blowhead of the glass forming machine. The glass parisons treated were amber GB-2000 beer bottles. The atomization rate was adjusted so that the colloidal alumina was entirely vaporized before the bottle was taken out of the mold. The resulting coating was transparent and colorless. The samples were made; five treated according to the methods of the present invention and five which were not treated with the colloidal sol.

Following the ASTM test BW the following is a report of the results:

TABLE I

| Sample No. | Treated Containers | Untreated Containers |
|---|---|---|
| 1 | 0.22 | 1.02 |
| 2 | 0.26 | 1.10 |
| 3 | 0.30 | 1.04 |
| 4 | 0.24 | 1.04 |
| 5 | 0.26 | 1.10 |

The colloidal alumina sol employed for the purposes of the present invention can range in concentration from about 0.02% up to about 1% with the dilute solutions being preferred.

Although applicants do not know the exact theory upon which glass surfaces are modified, it is believed that it is due to the particular nature of colloidal sol materials which result in their forming the highly durable and chemical resistant coatings of the present invention. It is believed that the colloidal particles being of a particularly small size and positively charged, actually sink or diffuse into the surface of the glass thereby forming a bond with the glass surface.

Although the present application emphasizes the use of colloidal alumina sol, which is preferred, colloidal silica and colloidal zirconia sols can also be employed according to the procedures specified.

What is claimed is:

1. In a method for producing a glass article comprising forming a parison from which the ultimate article is to be formed, enclosing said parison in a blow mold and expanding same to conformance with the blow mold to form said article therein by subjecting said parison to blow air under superatmospheric pressure, the improvement whereby the durability of the inner surface of the blown article is improved and which comprises introducing a colloidal alumina sol into the parison substantially simultaneously with said blow air in an amount sufficient to form a substantially continuous coating on the interior surfaces of the said glass article.

2. In a method for producing a formed, hollow glassware article comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical durability and resistance of said surfaces are improved and which comprises introducing a colloidal sol into the parison substantially simultaneously with said blow air in an amount sufficient to form a substantially continuous coating in the interior surfaces of the said glassware article, said sol being selected from the group consisting of alumina sol, silica sol and zirconia sol.

3. In a method for producing a formed, hollow glassware article comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical resistance and durability of said surfaces are improved and which comprises introducing a colloidal alumina sol into the parison during expansion in an amount sufficient to provide a substantially continuous coating of the interior surfaces of said glassware article.

4. In a method for producing hollow glassware containers comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical resistance and durability of said surfaces are improved and which comprises introducing, after completion of said expansion, a colloidal alumina sol into the article so formed prior to the opening of the mold in an amount sufficient to provide a substantially continuous coating of the interior surface of said glassware article.

5. In a method for producing hollow glassware containers comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical resistance and durability of said surfaces are improved and which comprises introducing a colloidal alumina sol into the parison during expansion substantially simultaneously with the blow air, prior to the opening of the finishing mold in an amount sufficient to provide a substantially continuous coating of the interior surfaces of said glassware container.

6. In a method for producing a formed, hollow glassware article comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical durability and resistance are improved and which comprises introducing a colloidal sol into the formed article prior to the opening of the finishing mold and at a temperature not substantially below the deformation temperature of the glass, said sol being selected from the group consisting of alumina sol, silica sol and zirconia sol.

7. In a method for producing hollow glass containers comprising forming a parison from which the ultimate article is to be formed, enclosing said parison in a blow mold and expanding same to conformance with the blow mold to form said article therein by subjecting said parison to blow air under superatmospheric pressure, the improvement whereby the chemical durability and resistance of the said surfaces are improved and which comprises spraying a dilute colloidal alumina sol into the formed article while the article is at a temperature not substantially below the deformation temperature of the glass and prior to the opening of the mold, in an amount sufficient to provide a substantially continuous coating on the interior of the said parison.

8. In the method of claim 7 wherein the sol is atomized into the glass article.

9. A glassware article treated according to the method as defined in claim 2.

10. In a method for producing hollow glassware articles comprising forming a parison from which the ultimate article is to be formed enclosing said parison in a blow mold and expanding same to conformance with the blow mold to form said article therein by subjecting said parison to blow air under superatmospheric pressure, the improvement whereby the chemical resistance and durability are improved and which comprises introducing a colloidal sol into the formed article while said article is at a temperature not substantially below the deformation temperature of the glass just after the opening of the blow mold, said sol being selected from the group consisting of alumina sol, silica sol and zirconia sol.

References Cited

UNITED STATES PATENTS

| | | | |
|---|---|---|---|
| 1,791,066 | 2/1931 | Smith | 65—30 |
| 2,154,490 | 4/1939 | Burch | 65—31 |
| 2,238,777 | 4/1941 | Lemmers et al. | 65—60 |
| 2,442,976 | 6/1948 | Heany | 65—60 |
| 3,013,901 | 12/1961 | Bugosh | 117—72 |

DONALL H. SYLVESTER, *Primary Examiner.*

S. LEON BASHORE, *Examiner.*

G. R. MYERS, *Assistant Examiner.*